United States Patent [19]
Kameda

[11] Patent Number: 5,779,402
[45] Date of Patent: Jul. 14, 1998

[54] CHIP ADHESION PREVENTING DEVICE FOR PREVENTING ADHESION OF CHIPS TO DRILL SHANK

[75] Inventor: Eiichi Kameda, Tsukuba, Japan

[73] Assignee: Nippon Mektron, Ltd., Tokyo-to, Japan

[21] Appl. No.: 815,587

[22] Filed: Mar. 12, 1997

[30] Foreign Application Priority Data

Mar. 28, 1996 [JP] Japan .................................. 8-073853

[51] Int. Cl.⁶ .................................................. B23B 47/34
[52] U.S. Cl. .................. 408/56; 408/61; 408/67; 409/137; 409/136
[58] Field of Search ........................ 408/56, 61, 67; 409/135–137

[56] References Cited

U.S. PATENT DOCUMENTS

| | | |
|---|---|---|
| 4,213,354 | 7/1980 | Dahinden. |
| 4,951,578 | 8/1990 | von Haas et al.. |
| 5,332,343 | 7/1994 | Watanabe et al. ............ 408/67 |
| 5,356,245 | 10/1994 | Hosoi et al. ............ 408/67 |
| 5,487,629 | 1/1996 | Watanabe ............ 409/136 |

FOREIGN PATENT DOCUMENTS

| | | | |
|---|---|---|---|
| 0 386 244 | 9/1990 | European Pat. Off. . | |
| 0 674 961 A1 | 10/1995 | European Pat. Off. . | |
| 58-114807 | 7/1983 | Japan ............ | 408/56 |
| 61-4646 | 1/1986 | Japan ............ | 409/137 |
| 6-39675 | 2/1994 | Japan ............ | 409/136 |
| 2 263 663 | 8/1993 | United Kingdom . | |
| 2 269 551 | 2/1994 | United Kingdom . | |
| 2 284 664 | 6/1995 | United Kingdom . | |
| 2 285 125 | 6/1995 | United Kingdom . | |

*Primary Examiner*—Steven C. Bishop
*Attorney, Agent, or Firm*—Fish & Richardson P.C.

[57] ABSTRACT

A chip adhesion preventing device is capable of preventing chips from adhering to the drill shank of a drill held on a spindle (1) included in a boring machine. Fluid passages (17, 23) are formed in the spindle (1) and a work holding member (19), respectively, and nozzle holes (18 and 22) are formed in the spindle (1) and the work holding member (19) so as to be connected to the outlet ends of the fluid passages (17 and 23), respectively, and to be directed toward the shank (13) of the drill (3). A high-pressure fluid is jetted through the nozzle holes (18, 22) toward the drill shank (13) to blow off chips (15) adhering to the drill shank (13).

5 Claims, 2 Drawing Sheets

1

CHIP ADHESION PREVENTING DEVICE FOR PREVENTING ADHESION OF CHIPS TO DRILL SHANK

BACKGROUND OF THE INVENTION

The present invention relates to a chip adhesion preventing device for preventing the adhesion of chips to a drill shank of a drill used on a boring machine for boring a workpiece by rotating the drill.

A chip adhesion preventing device for preventing the adhesion of chips to a drill shank of a drill used on a boring machine for boring a workpiece by rotating the drill is disclosed in, for example, JP-A No. 3-3713. Referring to FIG. 3 showing this prior art chip adhesion preventing device, a drill 3 is held by a chuck 2 on the extremity of a spindle 1. A cylindrical pressure foot 4 is disposed so as to surround the extremity of the spindle 1 and a pad 5 is attached to the outer surface of the bottom wall of the pressure foot 4. The pressure foot 4 is held with the lower surface of the pad 5 pressed against the upper surface of a protective plate 7 mounted on a printed wiring board 6 to press the printed wiring board 6 against a lower plate 8.

An air passage 9 is formed in a lower portion of the pressure foot 4, and a discharge opening 10 is formed in a portion of the side wall of the pressure foot 4 on a side opposite the side of the air passage 9. The air passage 9 is connected to a compressed air supply device, not shown, and the discharge opening 10 is connected to a suction device, not shown. An air passage 11 is formed in the pad 5 so as to be connected to the air passage 9 of the pressure foot 4. A nozzle 12 continuous with the air passage 11 opens in the inner circumference of the pad 5. In FIG. 3, indicated at 13 is a drill shank.

While the boring machine provided with the chip adhesion preventing device thus constructed is in operation, high-pressure compressed air supplied from the compressed air supply device flows through the air passage 9 of the pressure foot 4 and the air passage 11 of the pad 5 into the nozzle 12, and is blown at a high pressure through the nozzle 12 against the cutting drill body 14 of the drill 3 to cool the drill 3 and to remove chips 15 from the drill 3. Chips 15 blown off the drill body 14 of the drill 3 are sucked together with air by the suction device and are discharged outside through the discharge opening 10 of the pressure foot 4.

Although chips 15 adhering to the drill body 14 can be removed from the drill 3, chips adhering to the shank 13 cannot be removed. Some of the chips 15 adhering to the shank 13 are caused to drop onto the drill body 14 by the vibrations of the drill 3 and damage the bore and the workpiece. If many elongate cuttings wind around the shank 13, it is possible that a tool post is broken during automatic tool changing operation. Therefore, the boring operation needs to be interrupted frequently to remove chips 15 adhering to the shank 13, which reduces the efficiency of the boring machine remarkably.

SUMMARY OF THE INVENTION

Accordingly, it is an object of the present invention to solve the foregoing problems in the prior art and to provide a chip adhesion preventing device capable of preventing the adhesion of chips to a drill shank.

According to one aspect of the present invention, a chip adhesion preventing device for preventing the adhesion of chips to a drill shank used on a boring machine for boring a workpiece with a rotating drill comprises: the spindle of the boring machine, provided with a fluid passage, and a nozzle for blowing a fluid against the drill shank to remove chips adhering to the drill shank, connected to the fluid passage and having an axis directed toward the drill shank, and the work holding member of the boring machine, provided with a fluid passage, and a nozzle for blowing a fluid against the drill shank to remove chips adhering to the drill shank, connected to the fluid passage and having an axis directed toward the drill shank.

The chip adhesion preventing device of the present invention blows the fluid supplied into the fluid passages of the spindle and the work holding member of the boring machine through the nozzles connected to the fluid passages against the drill shank to remove chips adhering to the drill shank. Thus, the chip adhesion preventing device of the present invention is capable of easily removing chips adhering to the drill shank by the pressure of the fluid to enable the boring machine to form a clean bore without damaging the bore with chips. Since the drill shank is cleared of chips, an operation for inserting the drill shank into a drill post during an automatic drill changing operation can be accomplished with improved reliability. Since the boring machine need not be stopped to remove chips adhering to the drill shank, the efficiency of the boring machine is improved greatly.

Since the chip adhesion preventing device of the present invention needs only to blow the fluid, the chip adhesion preventing device of the present invention can be fabricated at a very low cost.

DETAILED DESCRIPTION OF THE PREFERRED EMBODIMENTS

Figure 3:
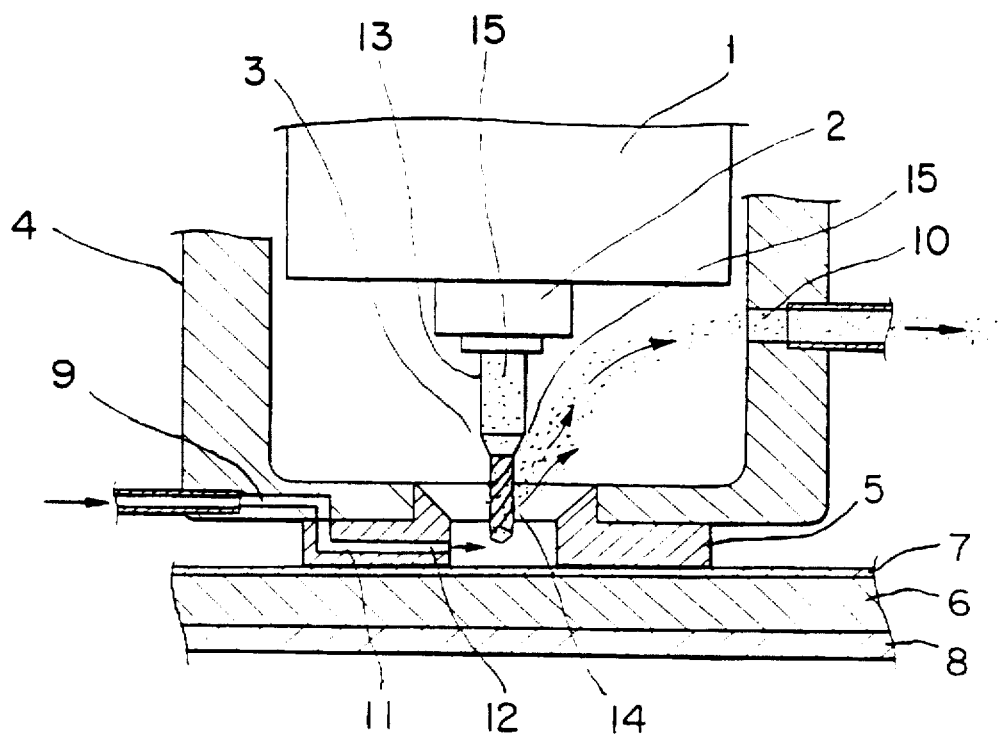
FIG. 3 is a longitudinal sectional view of a conventional boring machine.

Preferred embodiments of the present invention will be described hereinafter with reference to the accompanying drawings, in which parts like or corresponding to those of the prior art chip adhesion preventing device previously described with reference to FIG. 3 are designated by the same reference characters.

Figure 1:
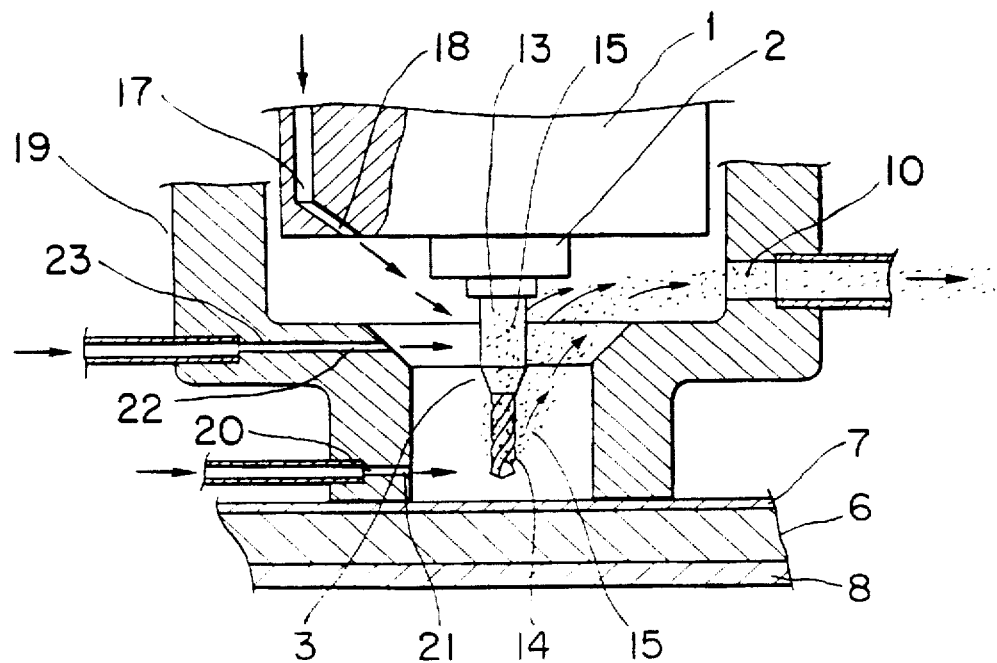
FIG. 1 is a longitudinal sectional view of a chip adhesion preventing device in a first embodiment according to the present invention.

Referring to FIG. 1 showing a chip adhesion preventing device in a first embodiment according to the present invention, a drill 3 is held by a chuck 2 on the extremity of a spindle 1 included in a boring machine. A fluid passage 17 having an axis parallel to that of the spindle 1, and a nozzle 18 connected to the fluid passage 17, having an axis inclined at an angle to the axis of the spindle 1 and directed toward the shank 13 of the drill 3.

A work holding member 19 has a cylindrical portion and a reduced cylindrical portion projecting downward from the lower wall of the cylindrical portion. The work holding member 19 is disposed with the lower end of the reduced cylindrical portion thereof pressed against the upper surface of a protective plate 7 mounted on a printed wiring board 6 to hold the printed wiring board 6 on a lower plate 6.

The reduced cylindrical portion of the work holding member 19 is provided with a lower fluid passage 20 having an axis perpendicular to the axis of the work holding member 19, connected to a compressed air supply device, not shown, and a lower nozzle 21 connected to the lower fluid passage 20 and opening in the inner circumference of the reduced cylindrical portion. The upper cylindrical portion of the work holding member 19 is provided at a position corresponding to the shank 13 of the drill 3 with an upper fluid passage 23 having an axis parallel to that of the lower fluid passage 20, and an upper nozzle 22 directed toward the shank 13 and opening in the inner circumference of the cylindrical portion. The fluid passage is connected to the compressed air supply device, not shown. A discharge opening 10 is formed in the side wall of the upper cylindrical portion of the work holding member 19 on a side opposite the side of the upper nozzle 22. The discharge opening 10 is connected to a suction device, not shown.

When starting the boring machine for a boring operation, the compressed air supply device is actuated to supply compressed air into the fluid passages 17, 20 and 23, and the suction device is actuated. The spindle 1 is lowered, and the work holding member 19 is pressed against the upper surface of the protective plate 7 to press the printed wiring board 6 against the lower plate 8 to form a bore in a predetermined portion of the printed wiring board 6 with the drill body 14 of the drill 3. Although chips 15 produced by cutting the printed wiring board 6 adhere to the drill body 14 of the drill 3, the chips 15 adhering to the drill body 14 are blown off the drill body 14 by the high-pressure compressed air blown through the nozzle 21. The chips 15 blown off the drill body 14 are sucked into and discharged outside through the discharge opening 10 by the action of the suction device.

Chips 15 adhering to the drill shank 13 and those going to adhere to the drill shank 13 are blown off the drill shank 13 by the high-pressure compressed air blown through the nozzles 18 and 22, and discharged outside. Thus, the adhesion of the chips to the drill shank 13 can be prevented.

A liquid, such as a cutting liquid may be used instead of compressed air.

Figure 2:
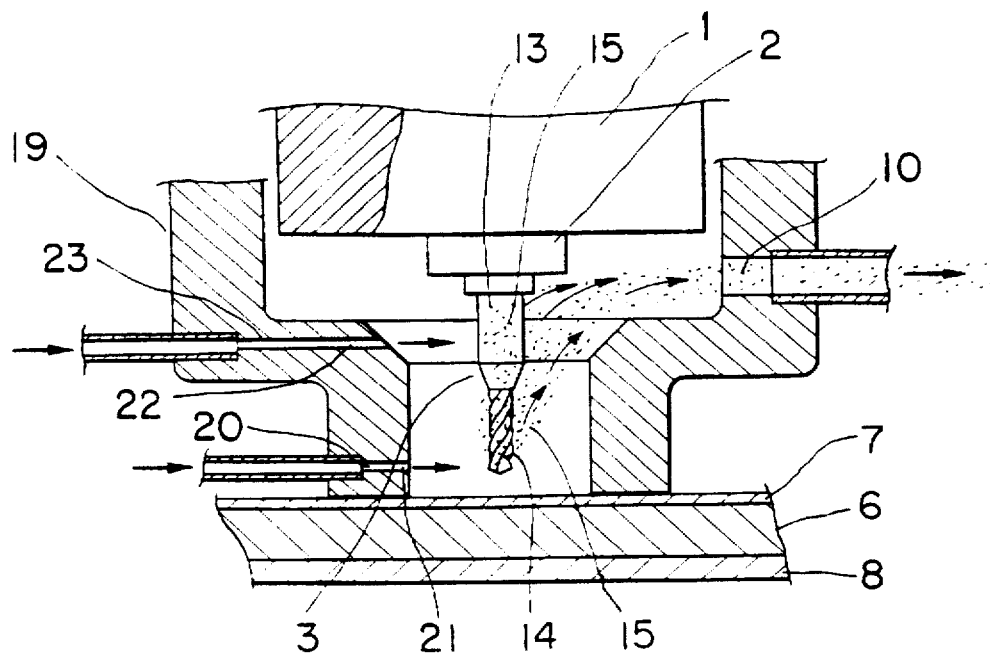
FIG. 2 is a longitudinal sectional view of a chip adhesion preventing device in a second embodiment according to the present invention.

FIG. 2 shows a chip adhesion preventing device in a second embodiment according to the present invention. The chip adhesion preventing device shown in FIG. 2 is similar in construction to the chip adhesion preventing device in the first embodiment, except that the former is not provided with any fluid passage corresponding to the fluid passage 17 and any nozzle corresponding to the nozzle 18. A compressed air supply device and a suction device are operated to supply compressed air into fluid passages 20 and 23, and to discharge the compressed air supplied to the chip adhesion preventing device. High-pressure compressed air is blown through a nozzle 22 against the drill shank 13 to blow chips 15 adhering to the drill shank 13 and those going to adhere to the drill shank 13 the drill shank 13 off by the high-pressure compressed air blown through the nozzle 22. Thus, the adhesion of chips 15 to the drill shank 13 can be prevented.

What is claimed is:

1. A chip adhesion preventing device for preventing the adhesion of chips to a drill having a drill shank and a drill body used on a boring machine having a spindle for boring a workpiece by rotating the drill, said chip adhesion preventing device comprising:

a cup-shaped work holding member to be placed on a workpiece, having a central hole through which the drill is brought into engagement with the workpiece;

a discharge opening formed in a portion of the work holding member;

a first cooling substance supply means formed at a position opposite the discharge opening with respect to the drill body to blow a cooling substance therethrough against the drill body;

a second cooling substance supply means formed at a position opposite the discharge opening with respect to the drill shank to blow the cooling substance therethrough against the drill shank; and a third cooling substance supply means formed in the spindle, the third cooling substance supply means having a passage with an axis parallel to an axis of the spindle, and a nozzle connected to an outlet end of the passage and formed so that an axis of the nozzle is inclined toward the drill shank such that the nozzle blows only against the drill shank.

2. The chip adhesion preventing device according to claim 1, wherein the first cooling substance supply means has a horizontal nozzle hole formed in the work holding member opposite the drill body.

3. The chip adhesion preventing device according to claim 1, wherein the second cooling substance supply means has a horizontal nozzle hole formed in the work holding member opposite the drill shank.

4. The chip adhesion preventing device according to claim 1, wherein the cooling substance includes a fluid.

5. The chip adhesion preventing device according to claim 1, wherein the cooling substance includes compressed air.

* * * * *